United States Patent
Schalles (10) Patent No.: US 11,371,894 B2
(45) Date of Patent: Jun. 28, 2022

(54) METHOD FOR THE IN-SITU CALIBRATION OF A THERMOMETER

(71) Applicant: Endress+Hauser Wetzer GmbH+Co. KG, Nesselwang (DE)

(72) Inventor: Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 586 days.

(21) Appl. No.: 16/467,297

(22) PCT Filed: Oct. 30, 2017

(86) PCT No.: PCT/EP2017/077743
§ 371 (c)(1),
(2) Date: Jun. 6, 2019

(87) PCT Pub. No.: WO2018/103949
PCT Pub. Date: Jun. 14, 2018

(65) Prior Publication Data
US 2020/0064208 A1  Feb. 27, 2020

(30) Foreign Application Priority Data

Dec. 8, 2016 (DE) .................. 10 2016 123 856.2

(51) Int. Cl.
*G01K 15/00* (2006.01)
*G01K 7/02* (2021.01)
(Continued)

(52) U.S. Cl.
CPC ............. *G01K 15/005* (2013.01); *G01K 7/02* (2013.01); *G01K 7/36* (2013.01); *G01K 11/00* (2013.01)

(58) Field of Classification Search
CPC ........ G01K 15/00; G01K 15/005; G01K 7/02; G01K 7/36; G01K 11/00; G01K 7/00
See application file for complete search history.

(56) References Cited

U.S. PATENT DOCUMENTS 4,030,314 A * 6/1977 Strehler .................... F25D 3/10
435/284.1
4,041,771 A * 8/1977 Allan ...................... G01M 3/18
374/E11.006
(Continued)

FOREIGN PATENT DOCUMENTS

CN 104316210 A 1/2015
CN 104538821 A * 4/2015 ............... H01S 3/04
(Continued)

OTHER PUBLICATIONS

Bernadett Bacsa in Solid-Phase Synthesis of Difficult Peptide Sequences at Elevated Temperatures: A Critical Comparison of Microwave and Conventional Heating Technologies, d Jun. 25, 2008, 11 pages (Year: 2008).*

*Primary Examiner* — Tung S Lau
(74) *Attorney, Agent, or Firm* — Christopher R. Powers; Endress+Hauser (USA) Holding Inc.

(57) ABSTRACT

The present disclosure relates to a method and apparatus for in-situ calibration and/or validation of a thermometer having a temperature sensor and a reference element composed at least partially of a material that undergoes a phase transformation at a phase transformation temperature, wherein the material remains in the solid phase in the phase transformation, the method including detecting and/or registering a measured value from the temperature sensor; detecting and/or registering a reference variable of the reference element; detecting the occurrence of the phase transformation based on a change of the reference variable; ascertaining a phase transformation time at which the phase transformation occurs; determining a sensor temperature using the temperature sensor at a measurement time that has the shortest time separation from the phase transformation time; and comparing the sensor temperature with the phase trans- (Continued)

formation temperature and/or determining a difference between the sensor temperature and the phase transformation temperature.

10 Claims, 3 Drawing Sheets

(51) Int. Cl.
*G01K 7/36* (2006.01)
*G01K 11/00* (2006.01)

(56) References Cited

U.S. PATENT DOCUMENTS

| | | | | |
|---|---|---|---|---|
| 4,627,740 | A * | 12/1986 | Jerde | G01K 15/00 374/102 |
| 5,022,045 | A * | 6/1991 | Elliott | G01N 21/81 374/18 |
| 8,440,973 | B1 * | 5/2013 | Fernandez | G01J 5/40 250/338.4 |
| 2005/0025212 | A1 | 2/2005 | Carter et al. | |
| 2005/0053114 | A1 | 3/2005 | Kang et al. | |
| 2012/0051389 | A1 * | 3/2012 | Schalles | G01K 15/002 374/1 |
| 2013/0090708 | A1 * | 4/2013 | Dabrowiak | A61F 7/12 607/105 |
| 2015/0285693 | A1 | 10/2015 | Schalles et al. | |
| 2018/0217010 | A1 | 8/2018 | Umkehrer et al. | |
| 2020/0064208 | A1 | 2/2020 | Schalles | |
| 2020/0377824 | A1 * | 12/2020 | Arlabosse | C11D 17/0065 |

FOREIGN PATENT DOCUMENTS

| | | |
|---|---|---|
| CN | 105987774 A | 10/2016 |
| DE | 19941731 A1 | 3/2001 |
| DE | 102010040039 A1 | 3/2012 |
| DE | 102011016612 A1 | 10/2012 |
| DE | 102012112575 A1 | 7/2014 |
| DE | 102015112425 A1 | 2/2017 |
| EP | 1247268 B2 | 8/2009 |
| JP | H01234774 A | 9/1989 |
| JP | 4023401 A | 12/2007 |
| JP | 2012122862 A | 6/2012 |
| RU | 91426 U1 | 2/2010 |
| SU | 1275232 A1 | 12/1986 |
| SU | 1700394 A1 | 12/1991 |
| WO | 2014095425 A2 | 6/2014 |
| WO | 2018103949 A1 | 6/2018 |

* cited by examiner

METHOD FOR THE IN-SITU CALIBRATION OF A THERMOMETER

CROSS-REFERENCE TO RELATED APPLICATIONS

The present application is related to and claims the priority benefit of German Patent Application No. 10 2016 123 856.2, filed on Dec. 8, 2016 and International Patent Application No. PCT/EP2017/077743 filed on Oct. 30, 2017, the entire contents of which are incorporated herein by reference.

TECHNICAL FIELD

The invention relates to a method for in-situ calibration and/or validation of a thermometer having at least one temperature sensor and at least one reference element, which reference element is composed at least partially of a material in which at least one phase transformation occurs at least one predetermined phase transformation temperature within a temperature range relevant for operation of the thermometer, wherein the material remains in the solid phase in the phase transformation.

BACKGROUND

Thermometers are available in the most varied of embodiments. Thus, there are thermometers, which use for measuring temperature the expansion of a liquid, a gas or a solid body with known coefficient of expansion, or also such, which relate the electrical conductivity of a material to temperature, such as, for example, in the case of applying resistance elements or thermocouples. In contrast, in the case of radiation thermometers, especially pyrometers, the determining of the temperature of a substance utilizes its thermal radiation. The underpinning measuring principles for each of these have been described in a large number of publications and thus are not detailed here.

The calibration and/or validation of a thermometer is usually performed in calibration baths, ovens or fixed-point systems. Such is done frequently based on a comparison measurement in a comparison liquid with a known reference temperature, i.e., at a fixed characteristic temperature point, such as, for example, the triple and/or melting point of a material. Alternatively, a calibration and/or validation can also be performed by means of a reference thermometer, for example, comprising a platinum element, preferably based on the international standard ITS-90.

Applied as typical comparison liquid is frequently deionized ice water in a Dewar container. This characteristic temperature point is, among other things, frequently utilized to determine the so-called $R_0$-value (R at T=0° C.) of a resistance temperature sensor (RTD—element for Resistance Temperature Detector) in the form of a platinum element according to the international standard, IEC60751, such as, for example, for a so-called Pt100 element.

Usually, for performing a comparison measurement, a thermometer is removed from the process in which it is being used. There are, however, also apparatuses known, which enable an in-situ calibration and/or validation of a thermometer, such as, for example, the miniaturized fixed-point cell described in DE 19941731 A1 integrated in a thermometer.

Another opportunity for calibration and/or validation of a thermometer is to take into consideration certain characteristic temperature points or characteristic lines or curves of a particular thermometer. Thus, described in EP1247268B2, for example, is a method for in-situ calibration of a plurality of integrated temperature sensors based on characteristic lines or curves of one or more reference elements in the form of secondary temperature sensors, which reference elements are installed in a thermometer insert supplementally to a primary temperature sensor. In order that a calibration can occur, the utilized reference elements differ with respect to construction and/or applied material from the primary temperature sensor, which results in different characteristic curves. Disadvantageous in such case, however, is that usually the characteristic lines or curves of the reference elements are subject to aging effects and/or sensor drift.

For preventing such disadvantages, known from DE102010040039A1 are an apparatus and method for in-situ calibration of a thermometer having a temperature sensor and a reference element for calibrating the temperature sensor, in the case of which the reference element is composed at least partially of a ferroelectric material, which experiences a phase transformation at least one predetermined temperature in the temperature range relevant for calibrating the temperature sensor. The calibration is thus based on the characteristic temperature point of a phase transformation of a ferroelectric material, thus performed based on a material-specific property. Depending on the number of installed reference elements, in this way, both a so-called 1-point as well as also a multipoint calibration and/or validation can be performed. A similar apparatus, especially suitable for multipoint calibrations, is known, furthermore, from the German patent application No. 102015112425.4 unpublished at the date of the first filing of the present disclosure. The thermometer described there includes at least one temperature sensor and at least two reference elements contacted via exactly two connection wires and composed at least partially of two different materials, each of which has in the temperature range relevant for calibrating the temperature sensor at least one phase transformation at least of second order at a characteristic predetermined phase transformation temperature. The disclosures of DE 102010040039A1 (US2012051389 and US20150285693) and DE 102015112425.4 (US20180217010) are incorporated here by reference.

Usually, a comparison measurement for calibration and/or validation of a thermometer is performed separated from the particular process. The measured values taken for calibrating can, in given cases, be memorialized in a calibration record. A separated comparison measurement requires, disadvantageously however, always a significant number of working steps.

SUMMARY

Starting from the above traced state of the art, an object of the present invention is to provide an especially easy method for in-situ calibration and/or validation of a thermometer. The object is achieved by the method as defined in claim 1 and by an apparatus suitable for performing the method, as such apparatus is defined in claim 10.

The method of the invention serves for in-situ calibration and/or validation of a thermometer having at least one temperature sensor and at least one reference element, which reference element is composed at least partially of a material in which at least one phase transformation occurs at least one predetermined phase transformation temperature within a temperature range relevant for operation of the thermometer, wherein the material remains in the solid phase in the phase transformation. The temperature sensor (primary sensor) is thus calibrated and/or validated using a secondary sensor (reference element). In such case, the thermometer can be, for example, a thermometer corresponding to one or more of the possible embodiments according to disclosure document DE102010040039A1 or according to the German patent application No. 102015112425.4 unpublished at the date of the first filing of this application.

The method includes at least method steps as follows:
detecting and/or registering, especially as a function of time, at least one measured value obtained by the temperature sensor,
detecting and/or registering, especially as a function of time, at least one characteristic physical or chemical reference variable of the reference element,
detecting the occurrence of the phase transformation based on an, especially abrupt, change of the reference variable,
ascertaining a phase transformation point in time, at which the phase transformation occurs,
determining a sensor temperature from a measured value obtained by the temperature sensor at a measurement point in time, which has the shortest time separation from the phase transformation point in time, and
comparing the sensor temperature with the phase transformation temperature and/or determining a difference, in given cases, between the sensor temperature and the phase transformation temperature.

In the case in which the difference determined for calibration and/or validation based on the comparison of the sensor temperature and the phase transformation temperature exceeds a predeterminable limit value, for example, an adjusting of a characteristic line or curve of the sensor element can be performed. This can be achieved, for example, by providing a calculational recipe, preferably for a characteristic line or curve correction, wherein, among other things, an offset, a slope, a curvature, and/or other relevant parameter of the characteristic line or curve of the thermometer can be adapted or changed. In the case in which a plurality of phase transformation temperatures are compared with different sensor temperatures, thus in the case of a multipoint calibration and/or validation, moreover, more than one parameter of a sensor characteristic line or curve can be adapted or changed based on the differences of the individual sensor temperatures from the associated phase transformation temperatures.

Fundamentally, a calibration and/or validation can, on the one hand, be automatically initiated. It is, for example, however, also possible to generate and/or output a report concerning the occurrence of a difference. However, many different options are possible for the steps performable following a detected difference, and all fall within the scope of the present invention.

It is to be noted, furthermore, that a difference present between the sensor temperature measured by means of the temperature sensor and the phase transformation temperature may not, in given cases, be caused solely by the temperature sensor. Rather, of concern is a total difference caused by the entire thermometer. Entering into this total difference are, besides influences of the sensor element, likewise influences from contacts, connection lines, or one or more components within the electronics unit. Moreover, likewise influences of the environment of the thermometer can play a role.

A phase transformation, wherein the particular material remains in the solid phase, is especially a phase transformation from the ferromagnetic into the paramagnetic phase or vice versa, from the ferroelectric into the paraelectric phase or vice versa, or also from a normal metal to a superconductor or vice versa.

In the case of a phase transformation in a material, where the material remains in the solid phase, such is, for example, a phase transformation at least of second order according to the Ehrenfest classification. In contrast to a phase transformation of first order, no or only a negligible amount of latent heat is given off during the phase transformation. When no or only a negligible amount of latent heat is given off, it can—basically and independently of the selected classification for phase transformations—among other things, be advantageously assured that the temperature measured by means of the temperature sensor at the point in time of the occurrence of a phase transformation is not corrupted, especially not by latent heat being given off.

In an additional, significantly more usual classification of phase transformations in the present state of the art, one distinguishes only between discontinuous (first order) and continuous (second order) phase transformations [compare, e.g., Lexikon der Physik, publisher: Spektrum Akademischer Verlag, Heidelberg Berlin, Vol. 4, under the entry Phasenübergänge and andere kritische Phänomene (phase transformations and other critical phenomena)]. According to this classification, different ferroelectric materials, for example, can, in turn, exhibit both phase transformations of first order as well as also phase transformations of second order, wherein, in both cases, the particular material, for which a phase transformation occurs, remains in the solid phase during the phase transformation.

The remaining in the solid phase independently of the selected classification of the phase transformation is decisive for the present invention. Furthermore, it is fundamentally advantageous that in the case of the occurrence of the phase transformation no or only a negligible amount of latent heat is given off.

Fundamentally, a phase transformation is accompanied by the change of a specific material property, for example, a change of the crystal structure, or a change of at least one magnetic, electrical or dielectric property. In the case of the present invention, the material-specific changes are known for the reference element and can be taken into consideration for a calibration and/or validation of the temperature sensor. In such case, one or more reference elements can be provided, wherein each reference element can have one or more phase transformations. Each phase transformation occurs at a certain characteristic, fixed and long-term stable temperature value, so that, in principle, no drift and/or aging effects need to be taken into consideration for a calibration and/or validation of the temperature sensor by means of the reference element.

In an embodiment, the material is a ferroelectric material, a ferromagnetic material, or a superconducting material.

Another embodiment provides that the at least one characteristic, physical or chemical variable is the crystal structure, the volume, or a dielectric, electrical, or magnetic property of the material.

In an embodiment of the method of the invention, the sensor temperature is ascertained based on a comparison of at least one measured value obtained by the temperature sensor with a temperature sensor characteristic line or curve.

The temperature sensor is, for example, a resistance element or a thermocouple.

Another embodiment of the method provides that a difference between the sensor temperature and the phase transformation temperature indicates a change of the temperature sensor characteristic line or curve. A change of the temperature sensor characteristic line or curve can result, for example, from aging effects of the temperature sensor, or also from an at least partial breaking of electrical connections or the like. Chemical reactions within the thermometer, mechanical stresses in the region of the sensor element and/or the connection wires, or also a change of characteristic lines or curves of at least one, especially electronic, component arranged within the electronics unit can likewise lead to a change of the measured temperature sensor characteristic line or curve.

An especially preferred embodiment provides that a model of dynamic heat flow is taken into consideration for determining a difference between the sensor temperature and the phase transformation temperature. In such case, the model is especially one, which takes into consideration an inhomogeneous and/or dynamic movement of heat within the thermometer, thus at the site of the temperature sensor and/or at the site of the reference element. Also, effects of heat removal, as brought about by changes in the ambient temperature, can be taken into consideration. Taking a model of dynamic heat flow into consideration is especially advantageous for the case in which the thermometer is exposed to an at least timewise and/or partially dynamic and/or inhomogeneous thermal environment, for example, for application in a flowing liquid or in the case of a variable ambient temperature of the thermometer.

Usually, a sensor head in which usually at least the temperature sensor is arranged is brought in contact, especially thermal contact, with a liquid for determining and/or monitoring temperature of the liquid. The reference element can be arranged in the same sensor head, although it does not have to be. In the ongoing operation, heat exchange occurs between the thermometer and the liquid until thermal equilibrium is established. Then the temperature sensor and the reference element, as well as the liquid, have essentially the same temperature, in the following referred to as the equilibrium temperature. A movement of heat from the liquid to the temperature sensor and to the reference element occurs. This is the case when the liquid has a higher temperature than the sensor head. The movement of heat can also be in the reverse direction, when the sensor head has a higher temperature than the liquid. Various constellations, such as, for example, an applying of the thermometer in an at least timewise and/or partially dynamic and/or inhomogeneous thermal environment, or also asymmetric configurations and/or geometric arrangements can, however, lead to the fact that the temperatures reigning at the site of the temperature sensor and at the site of the reference element are not at all times equal. The temperature sensor and the reference element are thus at certain points in time, which in each case lie before points in time when the equilibrium temperature has been established, exposed to different temperatures. In the case of a change of the temperature of the liquid from a first temperature to a second temperature, elements of the thermometer facing against the flow direction are exposed to the second temperature at an earlier point in time than the elements facing in the flow direction of the liquid. Of course, a number of other cases can lead to a temperature difference arising at least at times between the temperature of the temperature sensor and the temperature of the reference element.

When the temperature sensor is calibrated and/or validated by means of the reference element when there is no thermal equilibrium, errors and/or measurement inaccuracies can result, since the temperatures in the regions of the temperature sensor and the reference element are not the same at the calibration and/or validation point in time. Since, however, a model of dynamic heat flow is used, such errors and/or measurement inaccuracies can be prevented because such a model takes into consideration an inhomogeneous heat movement within the thermometer, for example, when the reference element and the temperature sensor are exposed at times and/or partially to different temperatures. In such case, it can, on the one hand, be a flowing liquid with variable temperature, into which the thermometer is inserted. However, also dynamic temperature differences because of heat removal by a variable ambient temperature of the thermometer, as well as thermal coupling effects because of the geometric embodiment of the thermometer and the thermal properties of the utilized materials, can be taken into consideration.

The model of dynamic heat flow is based preferably on physical and/or chemical variables, which especially specifically reflect a particular construction, or the particular arrangement and the particular geometry of the sensor, as well as the utilized materials, or of the apparatus, especially their thermophysical properties and heat transport processes resulting therefrom. Furthermore, variables, which concern the liquid or the environmental conditions, such as flow velocity, density, and/or viscosity, or also the thermal coupling of the sensor to the environment, can be of consequence.

Advantageously based on the model of dynamic heat flow, a time correction value $\Delta t_{dyn}$ is ascertained, after which the reference element and the temperature sensor have achieved the same temperature, wherein the time correction value $\Delta t_{dyn}$ is taken into consideration for determining a difference between the sensor temperature and the phase transformation temperature. The sensor temperature is thus not directly determined from a measured value compared with the phase transformation temperature and obtained by the temperature sensor at a measurement point in time and having the shortest time separation from the phase transformation point in time. Rather, first the time correction value $\Delta t_{dyn}$ is added/subtracted to/from the measurement point in time or the phase transformation point in time.

It is likewise advantageous that, based on the model of dynamic heat flow, a temperature correction value $\Delta T_{dyn}$ is ascertained that is present at a determinable point in time between the reference element and the temperature sensor, and wherein the temperature correction value $\Delta T_{dyn}$ is taken into consideration for determining a difference between the sensor temperature and the phase transformation temperature. The sensor temperature is thus not directly determined from a measured value obtained by the temperature sensor at a measurement point in time, which has the shortest time separation from the phase transformation point in time, and compared with the phase transformation temperature. Rather, first the temperature correction value $\Delta T_{dyn}$ is added/subtracted to/from the measured value, from the sensor temperature or the phase transformation temperature ascertained therefrom. Usually, thus, the temperature correction value $\Delta T_{dyn}$ is a temperature value. In the case in which the temperature correction value, however, is added/subtracted to/from the measured value obtained by the temperature sensor, it can also be a value with another unit, for example, an electrical current or an electrical voltage.

By means of the last two embodiments concerning the ascertaining of a time correction value $\Delta t_{dyn}$ or a temperature correction value $\Delta T_{dyn}$, thus effects of a temperature rate of change, which describes the reigning thermal environment of the thermometer, are taken into consideration. In the case of constant temperature rate of change, especially a difference between the sensor temperature and the phase transformation temperature at a determinable point in time is proportional to the temperature rate of change.

In an additional embodiment, the model of dynamic heat flow is a parametric model. The model is preferably suitable to provide a value for the time correction value $\Delta t_{dyn}$ and/or the temperature correction value $\Delta T_{dyn}$. Parameters used in the parametric model do not necessarily have to correspond to physical and/or chemical variables.

The parameters are ascertained, for example, by means of an estimating method. Such estimation methods are per se sufficiently known from the state of the art and are therefore not explained here in detail. The estimation of a value for a parameter can occur, for example, based on a defined change of an input variable, especially an input variable representing a heat flow in the environment of the thermometer, a flow of a liquid or a temperature or temperature rate of change, especially the temperature of the liquid, and by means of at least one measured value measured with the temperature sensor. A determining of the parameter in the particular process is, to the extent that the particular input variable is sufficiently known, likewise possible.

The object of the invention is achieved, furthermore, by an apparatus for in-situ calibration and/or validation of a thermometer, comprising at least a temperature sensor, a reference element, which reference element is composed at least partially of a material, in the case of which at least one phase transformation at least of second order occurs at least one predetermined phase transformation temperature within a temperature range relevant for operation of the thermometer, and an electronics unit, which electronics unit is embodied to execute at least one embodiment of the method of the invention.

The embodiments described in connection with the method are applicable mutatis mutandis also for the apparatus of the invention.

BRIEF DESCRIPTION OF THE DRAWINGS

The invention will now be explained in greater detail based on the appended drawing. Equal elements of the apparatus are provided with equal reference characters. The figures of the drawing show as follows.

DETAILED DESCRIPTION

Figure 1:
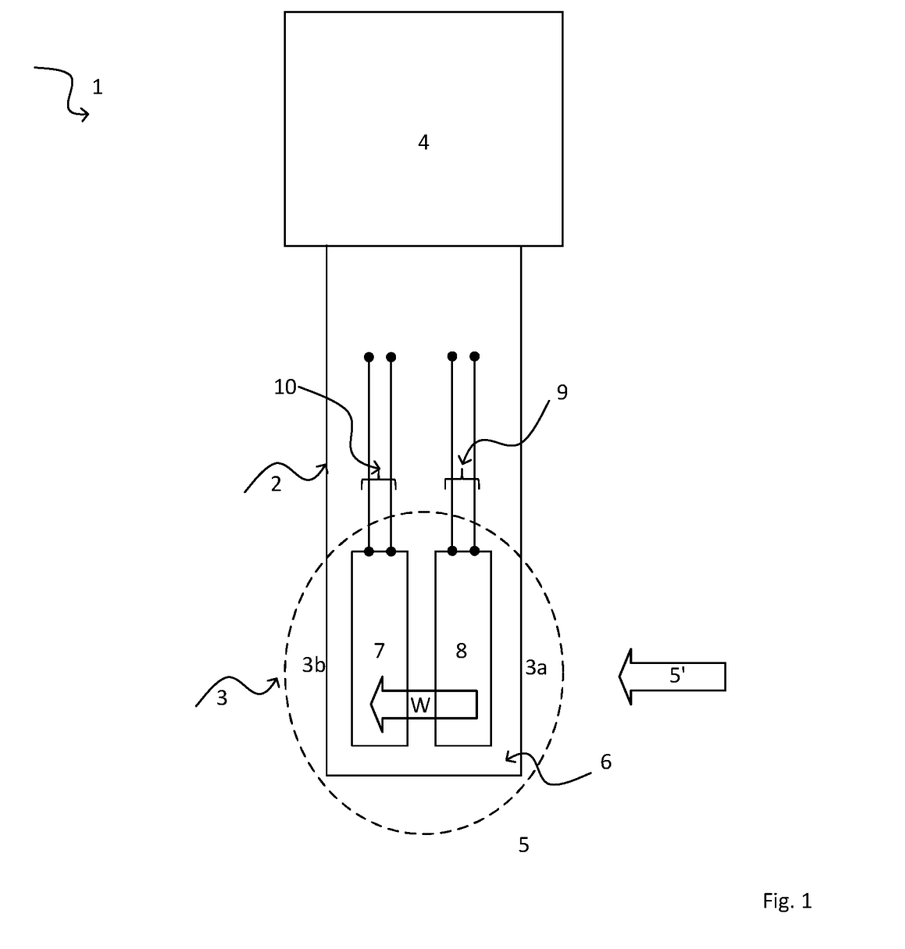
FIG. 1 shows a schematic representation of a thermometer having a temperature sensor and a separately contacted reference element for determining and/or monitoring temperature of a flowing liquid according to state of the art.

FIG. 1 presents a schematic illustration of a thermometer 1 with a protective tube 2 and an electronics unit 4 according to state of the art. The portion of the protective tube 2 toward the liquid 5 is referred to also as the sensor head 3. The internal volume of the sensor head 3 is filled with an, especially electrically insulating, filler 6, especially a cement. Furthermore, there are arranged in the interior of the sensor head 3 a temperature sensor 7 and a reference element 8, each of which is contacted, especially electrically contacted, by means of two connection wires, 9, 10 and connected with the electronics unit 4. Temperature sensor 7 is, for example, a resistance element or a thermocouple. Reference element 8, in turn, is composed at least partially of a material in which at least one phase transformation at least of second order occurs at least one predetermined phase transformation temperature within a temperature range relevant for operation of the apparatus. The number of needed connection wires 9, 10 for contacting the reference element 8 and the temperature sensor 7 can vary, depending on type of measuring principle applied. In the shown embodiment, the temperature sensor 7 and the reference element 8 are arranged mutually separated within the sensor head 3. They can, however, likewise directly contact one another and be, for example, soldered together.

Figure 2:
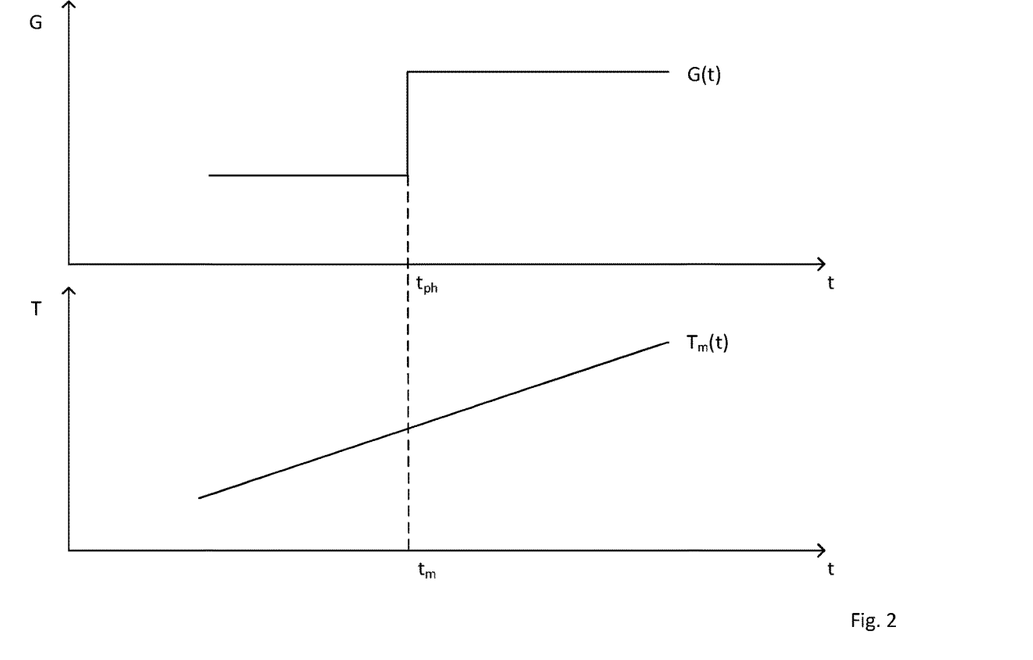
FIG. 2 shows an illustration of a first embodiment of the method of the present disclosure.

FIG. 2 illustrates how the temperature sensor 7 can be calibrated and/or validated by means of the reference element 8 based on the method of the invention. The upper diagram represents the course of a characteristic physical or chemical variable G used for detection of the phase transformation. If a phase transformation occurs in the reference element 8, this is accompanied in the illustrated example by an abrupt change of the variable G. The point in time, at which the abrupt change of the variable is detected, is the phase transformation point in time $t_{ph}$ at which the reference element 8 has the phase transformation temperature $T_{ph}$.

The lower diagram is the sensor temperature T ascertained by means of the temperature sensor 7 as a function of time t. For calibration and/or validation of the temperature sensor 7 based on the reference element 8, a measurement point at time $t_m$ is ascertained, which has the shortest time separation from the phase transformation point in time $t_{ph}$. The sensor temperature $T_m$ corresponding to the measurement point at time $t_m$ is compared with the phase transformation temperature $T_{ph}$ and, in the case of a difference $\Delta T = T_m(t_m) - T_{ph}(t_{ph})$ above a predeterminable limit value, the thermometer 1 can be automatically calibrated and/or validated and/or a report concerning the occurrence of a difference generated and/or output.

For a high accuracy of measurement, it must be assured that the temperature sensor 7 and the reference element 8 are ideally at all times in thermal equilibrium. In order to achieve this, usually various measures are performed of which some are listed in the following, by way of example:

1. Temperature sensor 7 and reference element 8 are arranged symmetrically within the sensor head 3, especially symmetrically relative to an imaginary axis extending in the longitudinal direction of the protective tube 2 through a center of the protective tube 2.
2. Temperature sensor 7 and reference element 8 are as thermally well coupled as possible (e.g., soldered).
3. Support substrates, in given cases, applied for the temperature sensor 7 and/or the reference element have essentially the same thermal conductivity.
4. Temperature sensor 7 and the reference element 8 are embodied in such a manner that they have essentially the same thermal capacitance.
5. The filler 6 and/or partitions (not shown) arranged in the region of the sensor head 3 are formed in such a manner that they assure isotropic and/or homogeneous heat movement within the sensor head 3.
6. All components of at least the sensor head 3 are embodied in such a manner that they have an as high as possible thermal conductivity.
7. The connection wires 9, 10 are so embodied that heat conduction occurring via the connection wires 9, 10 is minimum, and preferably is essentially the same via each connection wire 9, 10.

Even with greatest care with reference to the manufacture of a thermometer 1, however, different cases can occur in which the temperature sensor 7 and the reference element 8 are at least at times not in thermal equilibrium and, correspondingly, are exposed to different temperatures. This can in turn lead to considerable errors and/or measurement inaccuracies in the case of a calibration and/or validation of the temperature sensor 7 by means of the reference element 8.

Figure 3:
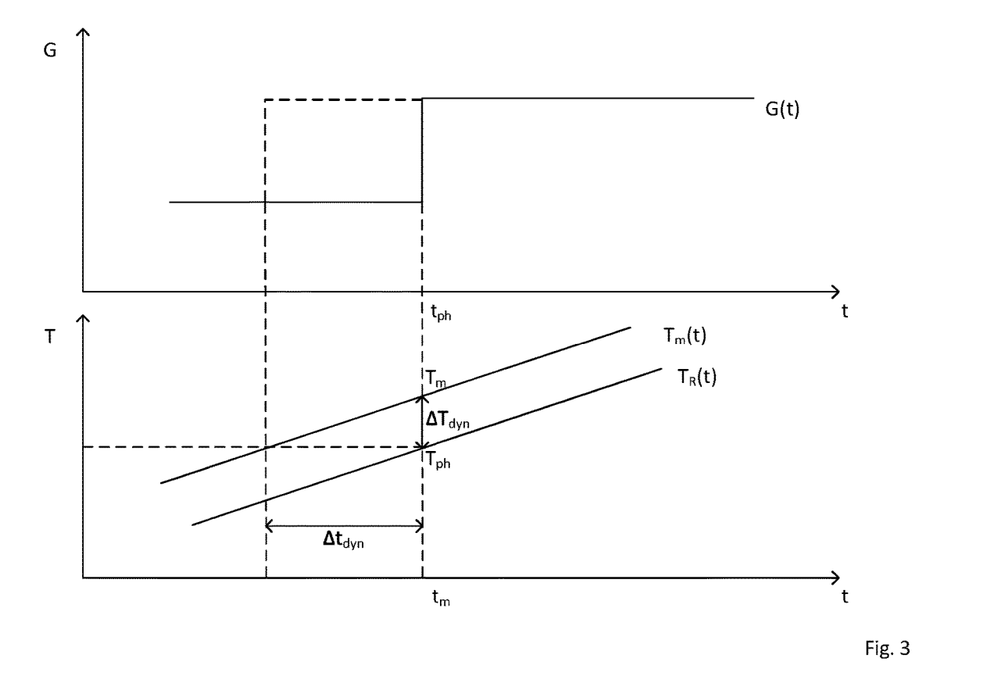
FIG. 3 shows an illustration of a second embodiment of the method of the present disclosure, taking into consideration a dynamic model of the heat flow.

In order the to be able to cope with this problem, in an additional embodiment of the method of the invention a dynamic model of the heat flow, or heat movement, is taken into consideration, such as illustrated, by way of example, in FIG. 3. The model is, in such case, adapted to the specific application of the thermometer 1 and takes into consideration, for example, in given cases, present heat flow, temperature or also temperature rate of change of the liquid 5 or the environment of the thermometer, the thermal conductivities and/or heat capacities of the particular materials utilized for the thermometer 1, or components, geometric dimensions within the thermometer, and/or the immersion depth of the thermometer in the particular liquid.

Figure 4:
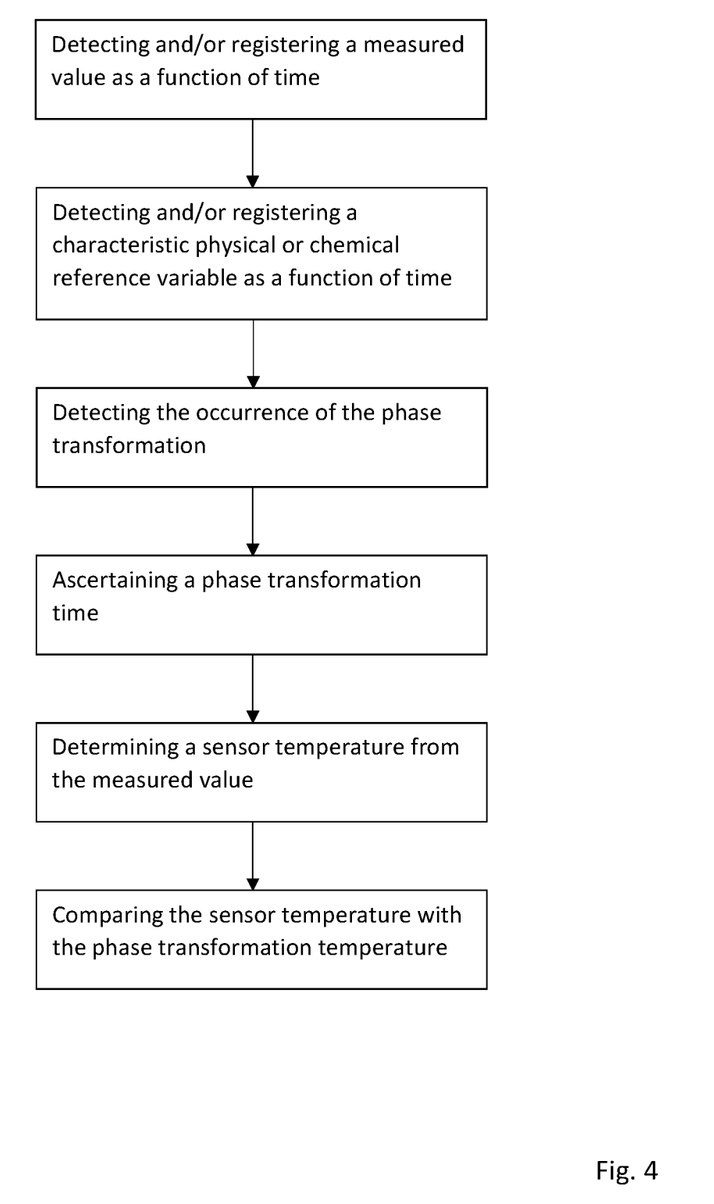
FIG. 4 depicts a flowchart of a method of the present disclosure.

FIG. 4 shows an embodiment of a method of employing a dynamic model of the heat flow according to the present disclosure. The following description is for the case in which the thermometer 1 is applied for determining the temperature of a flowing liquid 5. The thermometer 1 is, in such case, in contact with the flowing liquid 5 in such a manner that the temperature sensor 7 is arranged in the region facing against flowing liquid 5 and the reference element 8 in the region facing in the flow direction of the liquid 5. In this case, upon a temperature change from a first $T_1$ to a second $T_2$ temperature, the temperature sensor 7 reaches the second temperature $T_2$ always at an earlier point in time than the reference element 8.

If at a point in time $t_{ph}$, the occurrence of a phase transformation is detected, the temperature of the reference element 8 corresponds, at this point in time, to the phase transformation temperature $T_{ph}$. From a direct comparison of the phase transformation temperature $T_{ph}$ with the sensor temperature $T_m$ of the temperature sensor 7 at a measurement point in time $t_m$, which has the shortest time separation from the phase transformation point in time $t_{ph}$, however, no correct information for a calibration and/or validation of the temperature sensor 7 by means of the reference element 8 can be derived, since, as above described, because of the flow of the liquid 5, the temperature reigning at the site of the reference element 8 lags the temperature reigning at the site of the temperature sensor 7.

The dynamic model is embodied, for example, to provide a suitable correction value, for example, a temperature correction value $\Delta T_{dyn}$ or a time correction value, which correction value takes into consideration the influence of the inhomogeneous heat flow, or heat movement, within the thermometer 1, especially within the sensor head 3. The model is applicable for the case of an at least at times and/or partially inhomogeneous temperature field, which is caused by a liquid (for example, for application in a flowing liquid) or which is caused by the environment of the thermometer (for example, heat removal).

The particular correction value is used then for determining a difference present, in given cases, between the sensor temperature $T_m$ and the phase transformation temperature $T_{ph}$. For example, the difference is determined based on one of the two Equations, $\Delta T = T_{m dyn}(t_m - \Delta t_{dyn}) - T_{ph}(t_{ph})$, or $\Delta T = T_m(t_m) - \Delta T_{dyn} - T_{ph}(t_{ph})$. Alternatively, the correction values can also, in each case, be suitably added.

The invention claimed is:

1. A method for in-situ calibration and/or validation of a thermometer, the method comprising:
   providing a thermometer having a temperature sensor and a reference element composed at least partially of a material that undergoes a phase transformation at at least one phase transformation temperature within a temperature range of operation of the thermometer, wherein the material remains in the solid phase in the phase transformation;
   detecting and/or registering a measured value as a function of time using the temperature sensor;
   detecting and/or registering a characteristic physical or chemical reference variable as a function of time from the reference element;
   detecting the occurrence of the phase transformation based on a change of the reference variable;
   ascertaining a phase transformation time at which the phase transformation occurs;
   determining a sensor temperature from the measured value obtained using the temperature sensor at a measurement time that has the shortest time separation from the phase transformation time; and
   comparing the sensor temperature with the phase transformation temperature and/or determining a difference between the sensor temperature and the phase transformation temperature.

2. The method of claim 1, wherein the material is a ferroelectric material, a ferromagnetic material or a superconducting material.

3. The method of claim 1, wherein the characteristic physical or chemical variable is a crystal structure, a volume, or a dielectric, electrical or magnetic property of the material.

4. The method of claim 1, wherein the temperature is ascertained based on a comparison of the measured value obtained using the temperature sensor at the measurement time with a temperature sensor characteristic line or curve.

5. The method of claim 1, wherein a model of dynamic heat flow is used for determining the difference between the sensor temperature and the phase transformation temperature.

6. The method of claim 4, wherein the difference between the sensor temperature and the phase transformation temperature indicates a change of the temperature sensor characteristic line or curve.

7. The method of claim 5, wherein, based on the model of dynamic heat flow, a time correction value is ascertained after which the reference element and the temperature sensor have the same temperature, and wherein the time correction value is used for determining the difference between the sensor temperature and the phase transformation temperature.

8. The method of claim 5, wherein, based on the model of dynamic heat flow, a temperature correction value is ascertained, which is present at a determinable point in time between the reference element and the temperature sensor, and wherein the temperature correction value is used for determining the difference between the sensor temperature and the phase transformation temperature.

9. The method of claim 5, wherein the model of dynamic heat flow is a parametric model.

10. An apparatus for in-situ calibration and/or validation of a thermometer, the apparatus comprising:
   a temperature sensor;
   a reference element composed at least partially of a material in which at least one phase transformation occurs at at least one phase transformation temperature within a operating temperature range of the temperature sensor, wherein in the case of which phase transformation the material remains in the solid phase, and
an electronics unit configured to:
  register a measured value as a function of time using the temperature sensor;
  register a characteristic physical or chemical reference variable as a function of time from the reference element;
  register the occurrence of the phase transformation based on a change of the reference variable;
  ascertain a phase transformation time at which the phase transformation occurs;
  determine a sensor temperature from the measured value obtained using the temperature sensor at a measurement time that has the shortest time separation from the phase transformation time; and
  compare the sensor temperature with the phase transformation temperature and/or determine a difference between the sensor temperature and the phase transformation temperature.

\* \* \* \* \*